April 13, 1926.
J. F. MERKEL
1,580,381
STAND FOR BICYCLES, MOTOR CYCLES, AND THE LIKE
Original Filed Nov. 22, 1920
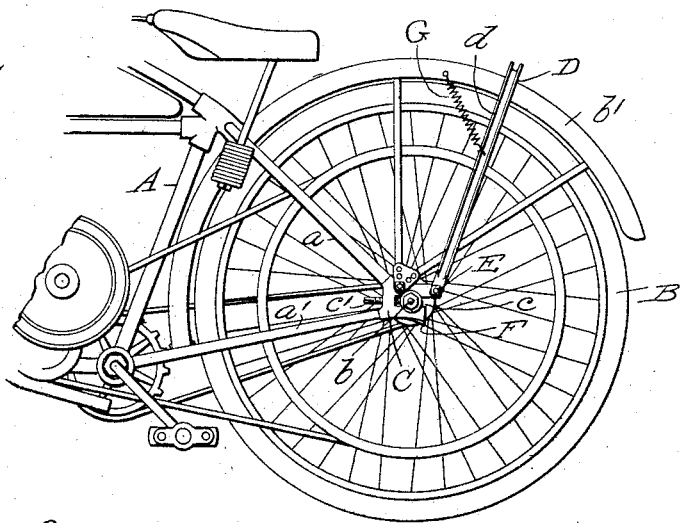
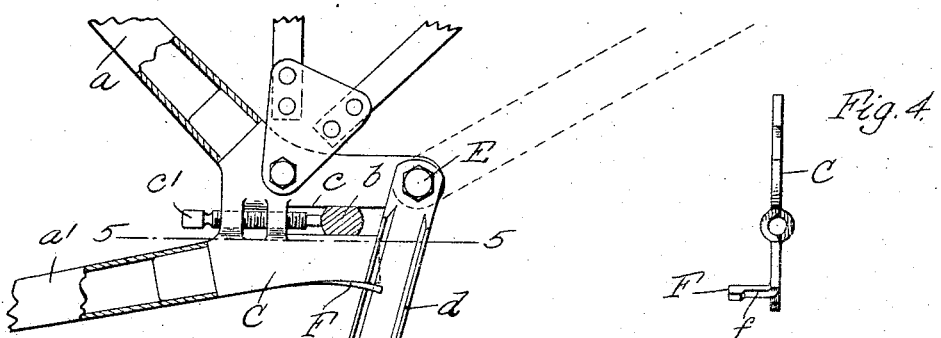
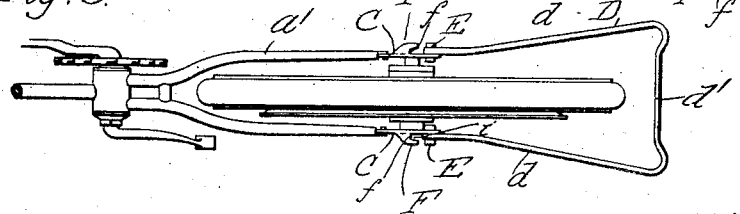
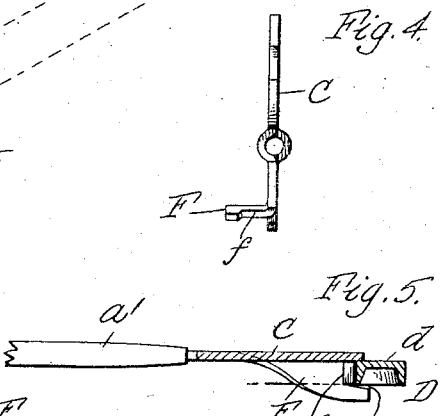
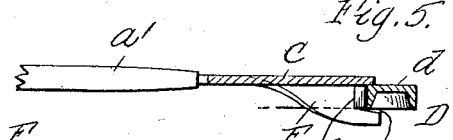
INVENTOR
Joseph F. Merkel,
by Parker & Brochnow.
his ATTORNEYS.

Patented Apr. 13, 1926.

1,580,381

UNITED STATES PATENT OFFICE.

JOSEPH F. MERKEL, OF ROCHESTER, NEW YORK, ASSIGNOR, BY MESNE ASSIGNMENTS, TO THE G. R. S. PRODUCTS, INC., OF COLONIE, NEW YORK, A CORPORATION OF NEW YORK.

STAND FOR BICYCLES, MOTOR CYCLES, AND THE LIKE.

Original application filed November 22, 1920. Serial No. 425,677. Divided and this application filed March 1, 1922. Serial No. 540,333.

*To all whom it may concern:*

Be it known that I, JOSEPH F. MERKEL, a citizen of the United States, residing at Rochester, in the county of Monroe and State of New York, have invented a new and useful Improvement in Stands for Bicycles, Motor Cycles and the like, of which the following is a specification.

This invention relates to stands or supports for holding bicycles, motorcycles or the like in an upright position, and more particularly to stands of this kind which are mounted on the frame of the bicycle or motor cycle and may be swung into and out of a supporting position.

The objects of this invention are to provide a stand or support of this kind of improved and simplified construction which is so arranged on the frame of the bicycle or motor cycle as to enable the stand to support the bicycle or motorcycle more rigidly than has been heretofore possible; also to so arrange the stand on the frame of the bicycle or motorcycle as to greatly facilitate the removal of the rear wheel and also to subject the stand to less strains when the same is in use; also to improve the construction of stands of this kind in other respects hereinafter specified.

In the accompanying drawings:

Fig. 1 is a fragmentary side elevation of a power or motorcycle provided with a stand or support embodying the invention.

Fig. 2 is a fragmentary side elevation partly in section showing on an enlarged scale the rear end of the motorcycle frame and illustrating the manner of supporting the stand thereon.

Fig. 3 is a bottom plan view on a reduced scale of the rear end of the motorcycle.

Fig. 4 is a rear elevation of one of the rear forked ends thereof, detached from the frame.

Fig. 5 is a sectional view thereof on line 5—5, Fig. 2.

This application is a division of my application No. 425,677, filed November 22, 1920, which resulted in Patent No. 1,400,967.

The invention is shown in the accompanying drawings as used in connection with a motorcycle, but it will be understood that the same may equally well be applied to a foot-propelled bicycle or other similar vehicle.

The motorcycle shown in the drawings is provided with the usual tubular frame A including upper and lower rear fork members $a$ and $a'$, a rear wheel B being supported by the rear fork members. The rear ends of the rear fork members are connected by means of the usual rear fork end pieces or axle supports C, having the usual slot $c$ opening rearwardly and in which the opposite ends of the axle $b$ of the rear wheel are arranged. $c'$ represents the usual adjusting screw extending into the slot $c$ for holding the rear axle in the desired relation in the slot and $b'$ represents a mud guard for the rear wheel. All of these parts have heretofore been used in connection with bicycles and motorcycles and of themselves constitute no part of this invention.

In order to support the bicycle or motorcycle in an upright position when the same is not in use, a stand D which may be of any usual or suitable construction, is preferably employed. The stand is of the usual U-shaped type, having two legs $d$ connected at their outer ends by means of a foot portion $d'$, the opposite ends of the legs being pivoted at E on the rear fork end pieces C, and in the construction shown, these pivots are arranged above the slots $c$ in the end pieces.

In order to hold the stand in position to support the bicycle from the ground the portions of the rear fork end pieces C below the slots $c$ are provided with outwardly bent flanges or parts F which extend into the path of movement of the legs $d$ of the stand when the same are swung about the pivots E and with which the legs are adapted to engage to hold the stand in the position shown in full lines in Fig. 2, in which position the bicycle will be supported in an upright position. The rear faces of the flanges F are provided with recesses into which portions of the legs $d$ of the stand may enter, the inner parts of the recesses forming stop faces $f$ against which the legs of the stand bear when the stand is in its operative position. The flanges are preferably also provided with rearwardly extending lips which form the sides of the recesses

*i* and which preferably flare outwardly so as to guide the legs of the stand into the stop recesses. In view of this construction, when the stand is in its operative position, both legs of the stand enter into the recesses in the rear fork end pieces and are securely held therein against lateral movement relatively to the frame of the bicycle or motorcycle, which reinforces the stand so as to rigidly support the bicycle or motorcycle in its upright position and also prevents wear and loosening of the connections between the stand and the bicycle or motorcycle.

By pivoting the stand D on the rear fork end pieces above the slots *c*, a much more rigid construction is obtained since the distance from the pivots E to the stop flanges F, which are preferably arranged at the lower edge of the rear fork end pieces, is considerably greater than in stands heretofore made in which the stand is pivoted below the slot, for the reason that the leverage acting on the stand is reduced by the arrangement shown.

This construction, therefore, lengthens the life of the stand owing to the fact that the stand is subjected to much less strain than in constructions heretofore used. The pivoting of the stand above the slots *c* has another advantage, namely that the removing of the rear wheel from the frame is greatly facilitated, this being done without removing the stand from the bicycle, while the stand is in the position shown in Fig. 1. The rear wheel can be removed by simply moving the wheel axle *b* to the end of the slot and then permitting the axle to move downwardly, thus clearing the mud guard *b'*. The stand can then be swung downwardly for supporting the bicycle or motorcycle in an upright position in the usual manner. In constructions in which the stand is pivoted on the rear fork end pieces below the slots *c*, the rear axle can only be removed from the slot when the stand is lowered or in its operative position but the rear wheel cannot be removed because the same becomes locked between the stand and the mud guard so that it is generally necessary to remove the stand in order to permit the rear wheel to be removed.

The arrangement of the stand relatively to the bicycle or power cycle as described has the additional advantage that, owing to the fact that the stand has a shorter radius than the mud guard *b'*, the stand may be wedged against the mud guard into the position shown in Fig. 1, if desired. The usual spring G is preferably also provided for holding the stand out of contact with the ground while the motorcycle is in operation.

I claim as my invention:

1. In a bicycle including a rear fork having end pieces integral therewith, the combination of a stand having two legs, means for pivoting said stand on said rear fork end pieces, and an outwardly bent part at the edge of each of said end pieces for reenforcing said end pieces against lateral bending, said parts having stop faces with which said legs of the stand are adapted to engage to limit the movement of said stand about its pivots, and lips at the sides of said stop faces and extending rearwardly therefrom and flaring outwardly, said lips serving to guide said legs into engagement with said stop faces and holding said stand and said bicycle against lateral movement relatively to each other.

2. In a stand for bicycles, the combination with a bicycle frame provided with rear fork end pieces having rearwardly opening slots therein, a stand having two legs pivoted to said fork end pieces above said slot, said fork end pieces each having an integral flange at the lower edge formed with a recess to receive the corresponding leg of said stand, the bottom of said recess constituting a stop to limit the swinging movement of the stand and the sides of said recess serving to hold the leg therein against lateral displacement.

JOSEPH F. MERKEL.